United States Patent [19]

Uchida et al.

[11] Patent Number: 4,771,841
[45] Date of Patent: Sep. 20, 1988

[54] VARIABLE POWER ASSIST STEERING SYSTEM FOR VEHICLE

[75] Inventors: Koh Uchida, Machida; Makoto Miyoshi, Kawasaki, both of Japan

[73] Assignee: Nissan Motor Co., Ltd., Yokohama, Japan

[21] Appl. No.: 102,412

[22] Filed: Sep. 29, 1987

[30] Foreign Application Priority Data

Sep. 30, 1986 [JP] Japan ................................ 61-231578

[51] Int. Cl.⁴ .............................................. B62D 5/08
[52] U.S. Cl. ........................................ 180/142; 91/51; 91/375 R
[58] Field of Search ..................... 180/143, 142, 141; 91/375 R, 374, 51, 166, 431, 463, 464

[56] References Cited

U.S. PATENT DOCUMENTS

| 4,465,098 | 8/1984 | Bacardit | 137/625.21 |
|---|---|---|---|
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 A |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,672,885 | 6/1987 | Kervagoret | 91/450 |

FOREIGN PATENT DOCUMENTS

| 0 041 887 | 12/1981 | European Pat. Off. . |
|---|---|---|
| 2 568 843 | 2/1986 | France . |
| 47-30039 | 11/1972 | Japan . |
| 54-15232 | 2/1979 | Japan . |
| 56-38430 | 9/1981 | Japan . |
| 56-174363 | 12/1981 | Japan . |
| 57-30663 | 2/1982 | Japan . |
| 58-156459 | 9/1983 | Japan . |
| 61-43229 | 9/1986 | Japan . |

Primary Examiner—John A. Pekar
Attorney, Agent, or Firm—Foley & Lardner, Schwartz, Jeffery, Schwaab, Mack, Blumenthal & Evans

[57] ABSTRACT

A flow control passage fluidly interconnects an output flow passage and a return flow passage to bypass a control valve. A control valve operation modifying variable orifice is disposed in and partly defines the flow control passage. The control valve operation modifying variable orifice is variable in flow area in response to at least one of vehicle control factors other than steering torque. A fixed flow area orifice is disposed in and partly defines the flow control passasge at a location downstream of the control valve operation modifying variable orifice. The control valve has a plurality of steering torque responsive variable orifices and bypass passage means for bypassing at least one of the steering torque responsive variable orifices. A differential pressure passage provides communication between the upstream and downstream sides of the fixed flow area orifice. An actuator is disposed in and partly defines the differential pressure passage. The actuator has a pressure movable part which is movable in response to variation of differential pressure produced by the fixed flow area orifice. The bypass passage means includes a differential pressure responsive variable orifice operatively connected to the pressure movable part of the actuator and variable in flow area in response to movement of the pressure movable part of the actuator.

9 Claims, 11 Drawing Sheets

VARIABLE POWER ASSIST STEERING SYSTEM FOR VEHICLE

BACKGROUND OF THE INVENTION

The present invention relates to a variable power assist steering system for a vehicle.

Among known power steering mechanisms, U.S. Pat. No. 4,561,521 discloses a power steering mechanism for an automotive vehicle having a pressure operated vehicle steering mechanism controlled by a rotary valve with primary and secondary valve portions. The primary valve portion develops a fast-rising steering pressure characteristic for incremental changes in steering torque at low driving speeds and a flatter or more gradual steering pressure rise characteristic for incremental changes in steering torque at high driving speeds. The latter resulting from the action of the secondary valve portion which functions in cooperation with the primary valve portion whereby the pressure versus torque relationship is optimized for parking maneuvers, for driving maneuvers and for center-feel. The change from the low speed steering mode to the high speed steering mode being gradual whereby the center-feel increases in proportion to increasing road speed. A speed sensitive valve is used to control fluid flow from the outlet side of a pump to the secondary valve portion so that at high vehicle speeds a parallel flow path is provided between the steering control valve and the pump as fluid is distributed to both primary and secondary valve portions. At low vehicle speeds, a speed sensitive valve restricts the flow of fluid from the pump to the secondary valve portion. Above a predetermined speed the speed sensitive valve opens thereby allowing fluid to be distributed from the pump to secondary valve portion in parallel with respect to the flow to the primary valve portion. A change from a high degree of power assist to a low degree of power assist, and conversely is effected by a variable force solenoid which is used to establish a parallel flow path from the pump to the secondary valve portion through a variable flow orifice. A speed sensing module controls the solenoid to open and close a variable orifice valve thus providing gradual changes in the degree of power assist as the vehicle speed changes.

U.S Pat. No. 4,570,735 discloses a power steering gear mechanism having a pressure operated vehicle steering mechanism controlled by a rotary valve with primary and secondary valve portions. This rotary valve is similar to the above mentioned known rotary valve.

The known steering control valves disclosed by the above two U.S. patents use a rotary valve with primary and secondary valve portions which are arranged out of position in the axial direction along the axis of rotation of the rotary valve. The valve grooves for the rotary valve are difficult to manufacture and require skilled labor. The arrangement of the primary and secondary valve portions causes increased axial length of the rotary valve.

In order to solve the above problem, a new power steering system has been proposed as disclosed in co-pending U.S. patent application Ser. No. 044,065, filed August 29, 1987. In view of the co-pending application, a main feature of the present invention resides in a system for controlling the operation of a control valve in response to a vehicle control factor other than steering torque, as a vehicle speed.

SUMMARY OF THE INVENTION

In accordance with the present invention, there is provided a novel and improved power steering system for a vehicle which comprises a flow control passage fluidly interconnecting an output flow passage and a return flow passage to bypass a control valve. A control valve operation modifying variable orifice is disposed in and partly defines the flow control passage. The control valve operation modifying variable orifice is variable in flow area in response to at least one of vehicle control factors other than steering torque. A fixed flow area orifice is disposed in and partly defines the flow control passage at a location downstream of the control valve operation modifying variable orifice. The control valve has a plurality of steering torque responsive variable orifices and bypass passage means for bypassing at least one of the steering torque responsive variable orifices. A differential pressure passage provides communication between the upstream and downstream sides of the fixed flow area orifice. An actuator is disposed in and partly defines the differential pressure passage. The actuator has a pressure movable part which is movable in response to variation of differential pressure produced by the fixed flow area orifice. The bypass passage means includes a differential pressure responsive variable orifice operatively connected to the pressure movable part of the actuator and variable in flow area in response to movement of the pressure movable part of the actuator.

DESCRIPTION OF THE PREFERRED EMBODIMENTS

Figure 1:
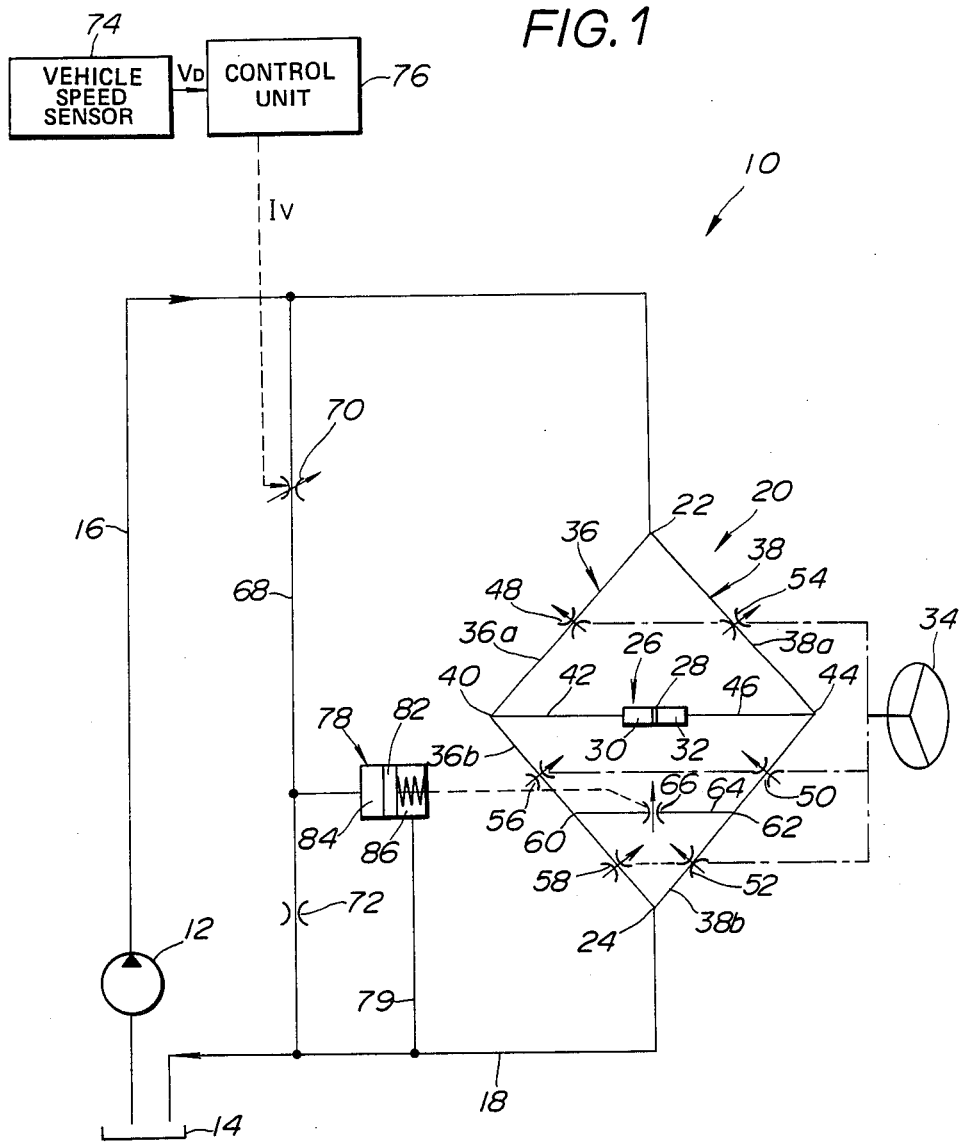
FIG. 1 is a simplified illustration of a power steering system according to an embodiment of the present invention.

In FIG. 1 numeral 10 designates a power steering system for a vehicle having a vehicle engine and dirigible vehicle wheels. The power steering system 10 includes a pump 12 adapted to be driven by the vehicle engine and a reservoir 14 fluidly connected to the pump 10 for supply of fluid thereto. The pump 12 includes a flow control valve of well-known design for maintaining a constant flow in a flow output passage 16 regardless of vehicle speed. The flow return passage for the pump 12 is shown at 18.

A fluid motor is shown at 26 as being in the form of a power cylinder having a power piston 28. The power piston 28 defines two chambers 30 and 32 within the power cylinder 26 and is connected to the dirigible vehicle wheels by way of a steering gear linkage. A steering wheel is shown at 34.

The control valve 20 includes two fluid passages 36 and 38 which are arranged in parallel between the inlet port 22 and the return port 24. The passages 36 and 38 are fluidly connected at the upstream ends to the inlet port 22 and at the downstream ends to the return port 24. The passage 36 has a left turn port 40 at a location intermediate between the upstream and downstream ends. The passage 36 is therefore divided by the port 40 into two passage sections 36a and 36bb. The passage section 36a islocated upstream of the port 40. The left turn port 40 communicates with the chamber 30 through a left turn passage 42. The passage 38 has a right turn port 44 at a location between the upstream and downstream ends. The passage 38 is therefore divided by the port 44 into two passage sections 38a and 38b. The passage section 38a is located upstream of the port 44. The right turn port 44 communicates with the chamber 32 of the power cylinder 26 through a right turn passage 46.

The control valve 20 includes a first set of variable orifices 48, 50 and 52 and a second set of variable orifices 54, 56 and 58.

The variable orifice 48 of the first set is disposed in and partly defines the passage section 36a. The variable orifices 50 and 52 of the first set are disposed in and partly define the passage section 38b in such a manner that the variable orifice 50 is located upstream of the variable orifice 52. The variable orifice 54 of the second set is disposed in and partly defines the passage section 38a. The variable orifices 56 and 58 of the second set are disposed in and partly define the passage secton 36b in such a manner that the variable orifice 56 is located upstream of the variable orifice 58.

The passage section 36b has a bypass port 60 at a location between the variable orifices 56 and 58. The passage section 38b has a bypass port 62 at a location between the variable orifices 50 and 52. A bypass passage 64 is provided which establishes communication between the bypass ports 60 and 62. A variable orifice 66, which takes the form of a spool valve though not limited to do so, is disposed in and partly defines the bypass passage 64 and is adapted to be actuated by an actuator which will be described hereinafter.

The variable orifices 48, 50 and 52 of the first set are adapted to decrease their flow areas respectively as steering torque increases during left turn of the steering wheel 34. The variable orifices 54, 56 and 58 of the second set are adapted to decrease their flow areas respectively as steering torque increases during right turn of the steering wheel 34.

Figure 2A:
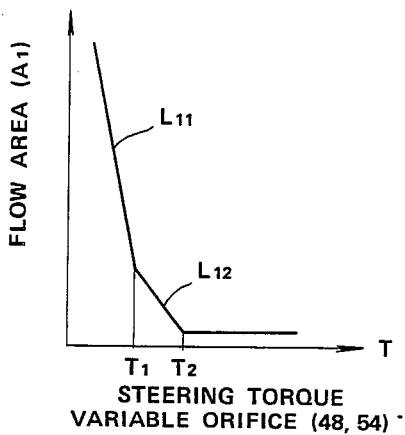
FIG. 2A is a chart that shows the relationship between the flow area and the steering torque.

More particularly, the variable orifice 48 of the first set and the variable orifice 54 of the second set are of the same kind and adapted to vary their flow areas $A_1$ in response to variation of steering torque as shown in FIG. 2A. The flow area $A_1$ decreases relatively rapidly as represented by the line $L_{11}$ as steering torque increases from zero to $T_1$. It then decreases relatively slowly as represented by the line $L_{12}$ as steering torque increases from $T_1$ to $T_2$. In response to steering torque exceeding $T_2$, the flow area $A_1$ is maintained at a constant small value near zero.

Figure 2B:
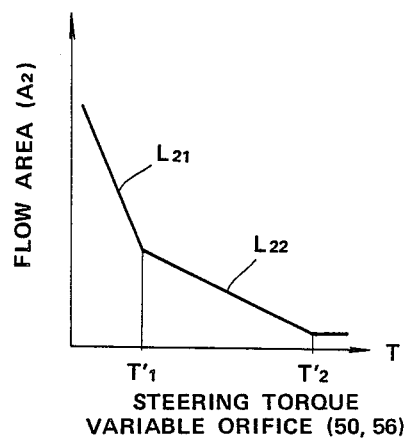
FIG. 2B is a chart that shows the relationship between the flow area and the steering torque.
Figure 2C:
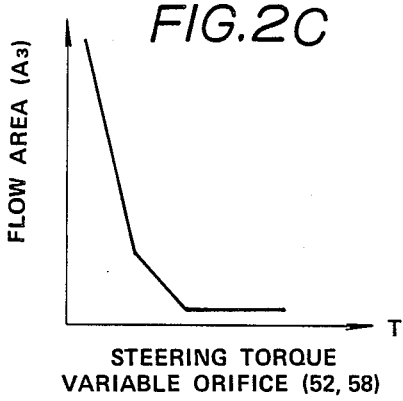
FIG. 2C is a chart that shows the relationship between the flow area and the steering torque.

The variable orifice 50 of the first set and the variable orifice 56 of the second set are of the same kind and adapted to vary their flow area $A_2$ in response to variation of steering torque as shown in FIG. 2B. The flow area $A_2$ decreases relatively slowly as represented by the line $L_{21}$ in response to increase of steering torque from zero to $T_1'$. In this connection, $T_1'$ is larger than $T_1$ so that the inclination of the line $L_{21}$ is more gentle than that of the line $L_{12}$. In response to steering torque exceeding $T_2'$, the flow area $A_2$ is maintained at a constant small value near zero.

The variable orifice 52 of the first set and the variable orifice 58 of the second set are of the same kind and adapted to vary their flow areas $A_3$ in response to variation of steering torque as shown in FIG. 3C, i.e., similarly to the variable orifices 48 and 54.

Variations of the flow areas $A_1$–$A_3$ of the variable orifices 48–58 actually result from relative displacement of control valve elements which will be described hereinafter. Relative displacement of the control valve elements takes place when torque is applied to a torsion bar in response to steering effort on the steering wheel 34.

A flow control passage 68 is provided which interconnects the flow output passage 16 and the flow return pasage 18 in such a manner as to bypass the control valve 20. A variable orifice 70 in the form of a solenoid operated flow control valve is disposed in and partly defines the flow control passage 68, and adapted to vary in flow area $A_5$ in response to variation of vehicle speed but irrespectively of operation of the above described variable orifices 48–58 of the control valve 20. An orifice 72 having a fixed flow area is disposed in and partly defines the flow control passage 68 at a location downstream of the variable orifice 70 so that a pressure differential is caused between the upstream and downstream sides of the fixed flow area orifice 72.

Figure 2D:
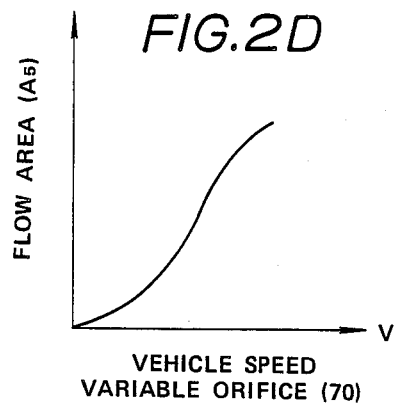
FIG. 2D is a chart that shows the relationship between the flow area and the vehicle speed.

The flow area $A_5$ of the variable orifice 70 increases gradually as represented by the S-like curve in FIG. 2D in response to increase of vehicle speed. In this connection, a vehicle speed sensor 74 is provided which produces a signal $V_D$ representing detected vehicle speed and applied it to a control unit 76. The control unit 76 generates an electric current $I_V$ based on the signal $V_D$ and applies it to the variable orifice 70 thereby allowing same to operate as shown in FIG. 2D.

Figure 2E:
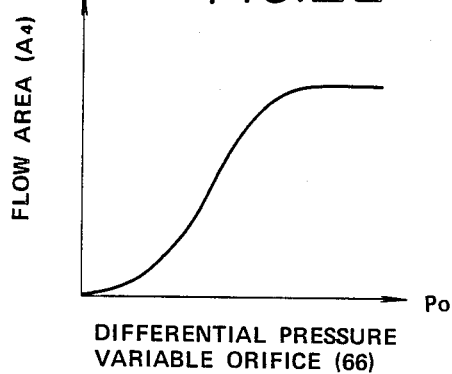
FIG. 2E is a chart that shows the flow area and the differential pressure.

A spring offset type double acting cylinder 78 is provided which serves as the aforementioned actuator for actuating the variable orifice 66 of the control valve 20. The double acting cylinder 78 is disposed in a passage 79 providing communication between he upstream and downstream sides of the fixed flow area orifice 72. A piston 82 defines within the cylinder 78 two chambers 84 and 86. The chambers 84 and 86 communicate with the upstream and downstream sides of the fixed flow area orifice 72 through the passage 79, respectively. The piston 82 is operatively connected to the variable orifice 66 so that the flow area $A_4$ of the orifice 66 increases as represented by the S-like curve in FIG. 2E in response to increase of the differential pressure $P_O$ between the upstream and downstream sides of the fixed flow area orifice 72.

Figure 3A:
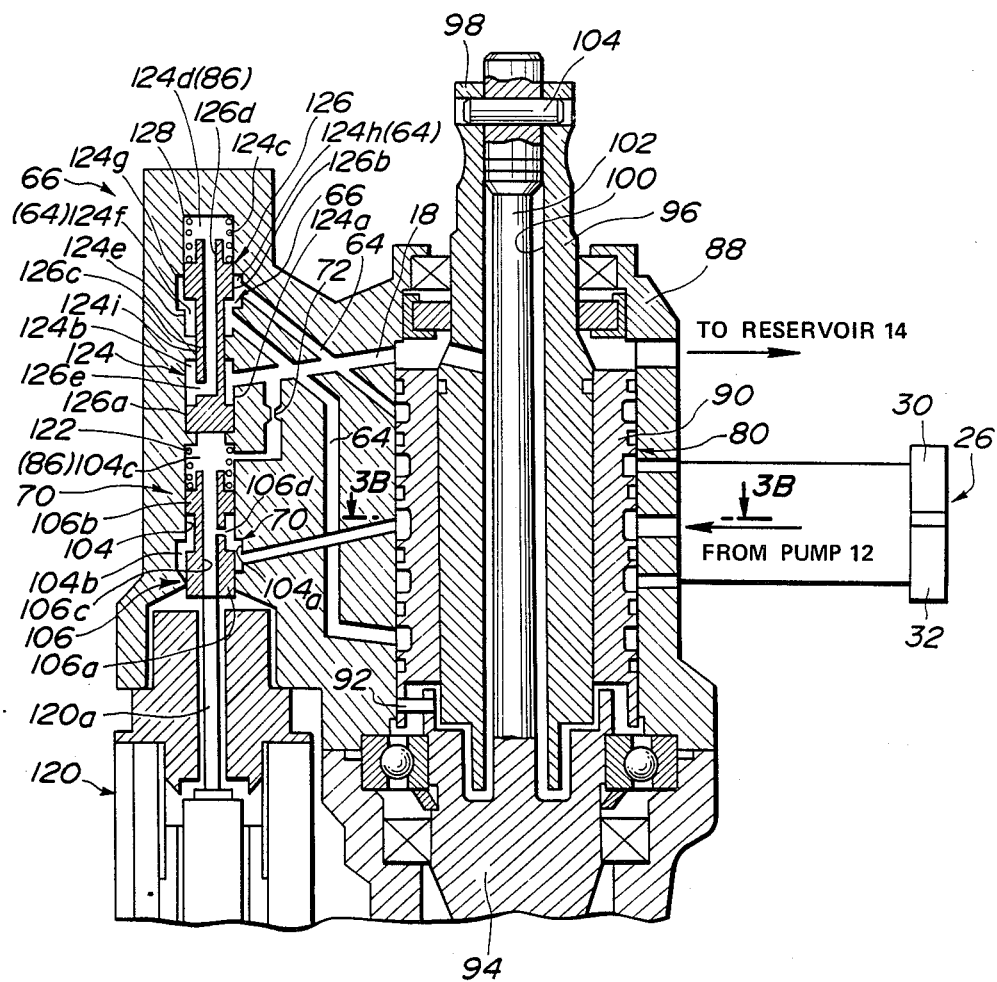
FIG. 3A is a sectional view of one practical form of the power steering system of FIG. 1.
Figure 3B:
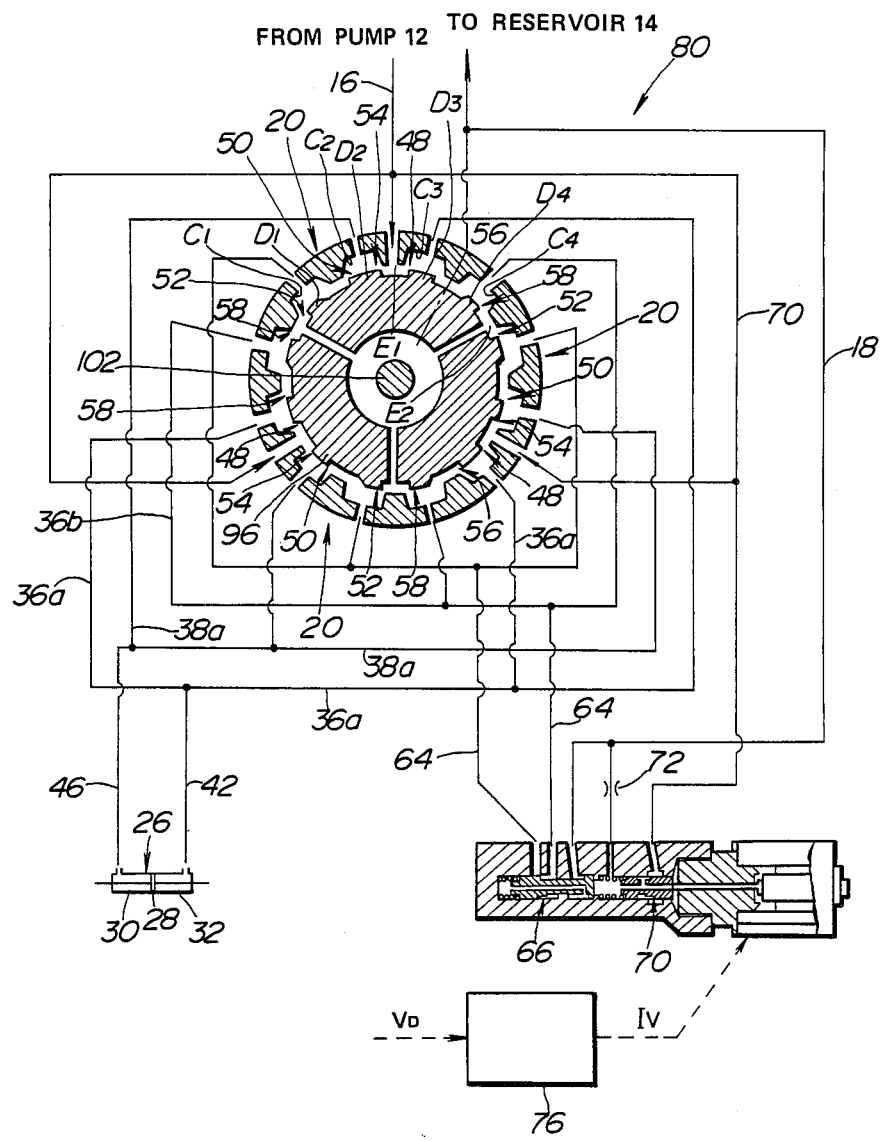
FIG. 3B is a sectional view taken along the line 3B—3B in FIG. 3A.

The control valve 20 actually takes the form of a rotary valve 80 as shown in FIGS. 3A and 3B. The rotary valve includes a valve housing 88 having a valve opening 90 within which a valve sleeve 90 is received. The valve sleeve 90 is pinned at 92 to a pinion 94 for a power steering gear. The pinion 94 is adapted to engage a rack for a power steering gear to which the steering gear linkage of an automotive vehicle is connected. The rack is connected to the pressure movable part or piston 28 of the power cylinder 26. A valve spool element 96 is connected or formed integrally with a steering shaft 98 which is in turn connected to the steering wheel 34. The valve spool element 96 is located within the valve sleeve 90 and is provided with a central opening 100 through which a torsion bar 102 extends. The torsion bar 102 is pinned at 104 to the steering shaft 98.

The rotatry valve 80 consists of three control valves 20 which are arranged in parallel with each other and every 120° round the center axis of the torsion bar 102.

Each control valve 20 includes four axially elongated grooves $C_1$–$C_4$ formed in the inner circumferential wall of the valve sleeve 90 and four axially elongated projections $D_1$–$D_4$ formed in the outer circumferential wall of the valve spool element 96 in such a manner that the grooves $C_1$–$C_4$ respectively register with the projections $D_1$–$D_4$.

The groove $C_1$ and te anticlockwise-rotational leading edge of the projection $D_1$ cooperate to define the variable orifice 52 of the first set. The groove $C_2$ and the anticlockwise-rotational leading edge of the projection $D_2$ cooperate to define the variable orifice 50 of the first set. The groove $C_2$ and the clockwise-rotational leading edge of the projection $D_2$ cooperate to define the variable orifice 54 of the second set. The groove $C_3$ and the anticlockwise-rotational leading edge of the projection $D_3$ cooperate to define the variable orifice 48 of the first set. The groove $C_3$ and the clockwise-rotational leading edge of the projection $D_3$ cooperate to define the variable orifice 56 of the second set. The groove $C_4$ and the clockwise-rotational leading edge of the projection $D_4$ cooperate to define the variable orifice 58 of the second set.

The depression $E_1$ defined between the projections $D_2$ and $D_3$ communicates with the pump 12 through a passage formed in the valve sleeve 90. The depression $E_2$ defined between the projections $D_4$ and $D_1$ of the adjacent two control valves 20 and 20 communicates with the reservoir 14 through the inside of the valve spool element 96. The grooves $C_2$ and $C_3$ of the valve spool element 96 are respectively communicated with the chambers 30 and 32 of the power cylinder 26. The grooves $C_1$ and $C_4$ are respectively communicated with the opposite sides of the variable orifice 66.

The valve housing 88 has another valve opening 104 in which a valve spool 106 is received. The valve opening 104 has a larger diameter opening section 104a which cooperates with a valve land 106a of the valve spool 106 to define the aforementioned variable orifice 70. A solenoid 120 is installed in the valve housing 88 and has a plunger 120a which drives the valve spool 106 in one direction, i.e. in the direction causing the variable orifice 70 to decrease in flow area, when the solenoid 120 is energized. The valve spool 106 has another valve land 106b which cooperates with the valve land 106a to define therebetween an annular valve opening section 104b. The annular valve opening section 104b is communicable with the output flow passage 16 through the variable orifice 70. The valve opening 104 has a valve opening section 104c at one axial end of the valve spool 106. A coil spring 122 is disposed in the valve opening section 104c to urge the valve spool 106 toward the plunger 120a of the solenoid 120, i.e., in the direction causing the variable orifice 70 to decrease in flow area. The valve spool 106 is provided with a central opening 106c and a radial opening 106d which establish communication between the annular valve opening section 104a and the valve opening section 104c. The valve opening section 104c is communicated through the fixed flow area orifice 72 with the return flow passage 18.

The valve housing 88 has a further valve opening 124 which is axially aligned with the valve Opening 104 and communicated at one end with the valve opening section 104c of the valve opening 104. A valve spool 126 is located in the valve opening 124 and has two valve lands 126a and 126b of the same diameter. The valve opening 124 has a plurality of valve opening sections of three different diameters. A valve opening section 124a of the first kind diameter, which is equal in diameter to the valve lands 126a and 126b is located next to the valve opening section 104c of the valve opening 104 and received therein the valve land 126a. The valve spool 126 has an intermediate spool portion 126c between the valve lands 126a and 126b. The intermediate spool portion 126c is partly received in the valve opening section 124a to define therearound an annular space 124b which is communicated with the downstream side of the fixed flow area orifice 72. In this connection, the valve opening section 104c of the valve opening 104 is adapted to constitute the chamber 86 of the actuator 78 and communicated with the upstream side of the fixed flow area orifice 72. Another valve opening section 124c of the first kind diameter is located so as to receive the other valve land 126b and adapted to provide a fluid chamber 124d at an end of the valve spool 126. A further valve opening section 124e of the first kind diameter is provided between the valve opening sections 124a and 124c and adapted to receive therewithin the intermediate spool portion 126c to define therearound an annular space 124f which constitutes part of the bypass passage 64. A valve opening section 124g of the second kind diameter which is larger than the first kind diameter is provided between the valve opening sections 124c and 124e and define around the valve land 126b an annular space 124h which constitutes part of the bypass passage 64. In this connection, the valve land 126b is adapted to cooperate with the valve opening section 124e to define the variable orifice 66. A valve opening section 124i of the third kind which is smaller than the first kind diameter is provided between the valve opening sections 124a and 124e to fittingly receive therein the intermediate spool portion 126c. The valve spool 126 is provided with a central opening 126d and a radial opening 126e through which the fluid chamber 124d is communicated with the annular space 124b and therefore with the downstream side of the fixed flow area orifice 72. The annular space 124b, central opening 126d and the fluid chamber 124d cooperate to define the chamber 86 of the actuator 78, whilst the chamber 84 of the actuator 78 is constituted by the valve opening section 104C. A coil spring 128 is disposed in the chamber 124c to urge the valve spool 126 in one direction, i.e., in the direction causing the variable orifice 66 to decrease in flow area.

The operation of the power steering system 10 will now be described. Now let us assume that the vehicle is in a standstill condition with the steering wheel 34 being held in its neutral position for holding the dirigible wheels in their straight-ahead running positions. Under this condition, the variable orifices 48–58 of the control valve 20 are all held in their fully open positions whilst the vehicle speed sensor 74 detects that the vehicle speed is zero. The variable orifice 70 is fully closed thus preventing flow of fluid toward the fixed flow area orifice 72 and allowing the differential pressure $P_O$ between the upstream and downstream sides of the orifice 72 to become zero. Due to this, the piston 82 of the actuator 78 is urged in the left-hand direction in FIG. 1 under the bias of the spring 83 to hold the variable orifice 66 of the control valve 20 in a passage blocking position to obstruct communication betwen the bypass ports 60 and 62.

As a result, working fluid discharged from the pump 12 is all supplied through the inlet port 22 to the fluid passages 36 and 38 of the control valve 20. However, since the fluid is equally distributed to the fluid passages 36 and 38, the chamber 30 and 32 of the power cylinder 26 are subjected to the same fluid pressure, resulting in that the power cylinder 26 does not produce any steering assist power.

Under this vehicle standstill condition, turning of the steering wheel 34 to the right causes the variable orifices 54, 56 and 58 of the second set to decrease their flow areas $A_1$–$A_3$ in accordance with the magnitude of steering torque whilst allowing the variable orifices 48, 50 and 52 of the first set to remain in their fully open positions.

Figure 4:
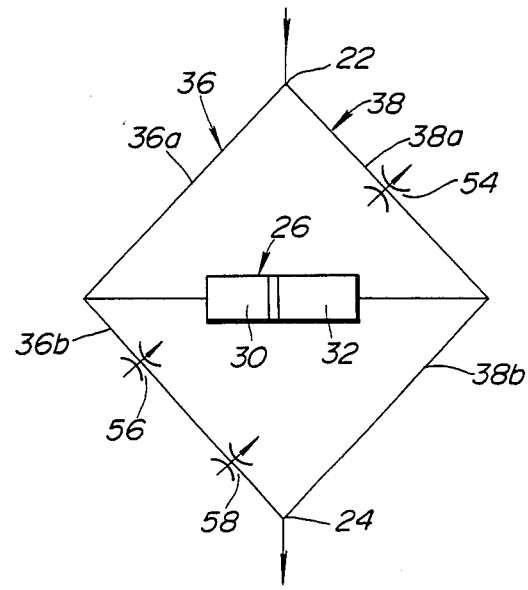
FIG. 4 is a fragmentary enlarged view of FIG. 1 showing the position of parts assumed upon right turn at zero vehicle speed.

Accordingly, the fluid passage section 36a can be equated to a passage section in which the variable orifice 48 is not provided. Similarly, the fluid passage section 38b can be equated to a passage section in which the variable orifices 50 and 52 are not provided. On the other hand, the variable orifice 66 remains in its passage blocking position. The control valve 20 can therefore be regarded as having such an equivalent fluid circuit structure as shown in FIG. 4.

When this is the case, the series connected variable orifices 56 and 58 can be regarded as constituting a single variable orifice of a flow area $A_A$ and being operative to effect the same pressure loss. The pressure fall $P_2$ kg/cm² due to the variable orifice 56 and the pressure fall $P_3$ due to the variable orifice 58 can be determined by the following expressions (1) and (2):

$$P_2 = K \cdot Q^2 / A_2^2 \qquad (1)$$

$$P_3 = K \cdot Q^2 / A_3^2 \qquad (2)$$

where K is a constant given by $\rho/2g$ ($\rho$ is specifice weight of working fluid and g is gravity), and Q is flow rate of working fluid passing through the orifices 56 and 58.

From these expressions (1) and (2), the overall pressure fall P Kg/cm² occuring in the fluid passage section 38a is determined as follows:

$$\begin{aligned} P &= P_2 + P_3 \\ &= K \cdot Q^2 \left[ \frac{1}{A_2^2} + \frac{1}{A_3^2} \right] \\ &= K \cdot Q^2 \frac{1}{\left[ \frac{1}{\sqrt{1/A_2^2 + 1/A_3^2}} \right]^2} \end{aligned} \qquad (3)$$

The parenthesized portion $\dfrac{1}{\sqrt{1/A_2^2 + 1/A_3^2}}$ of the expression (3) corresponds to the combined equivalent flow area $A_A$ of the variable orifices 56 and 58. The combined equivalent flow area $A_A$ is therefore determined by the following expression:

$$A_A = \frac{1}{\sqrt{1/A_2^2 + 1/A_3^2}} \qquad (4)$$

Figure 5:
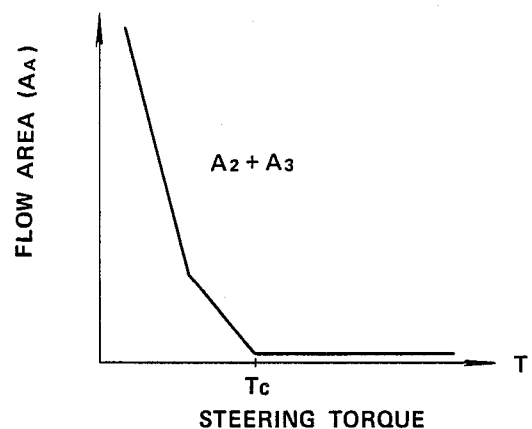
FIG. 5 is a chart that shows the relationship between the equivalent flow area and the steering torque.

The characteristic curve for the combined equivalent flow area $A_A$ in relation to the steering torque is shown in FIG. 5 and is obtained by combining the characteristic curves for the variable orifices 56 and 58 shown in FIGS. 2A and 2B. In this instance, the variable orifice 58 is more effective for variation of the combined equivalent flow area $A_A$ than the variable orifice 56 since the variable orifice 58 effects a smaller flow area than the variable orifice 56 for a given steering torque.

Further, since the variable orifice of the combined equivalent flow area $A_A$ has a parallel relationship with the variable orifice 54, the overall restricted flow area A of the control valve 20 is given by the sum of the flow areas $A_A$ and $A_1$. Thus, $$A = A_A + A_1 \qquad (5)$$

Figure 6A:
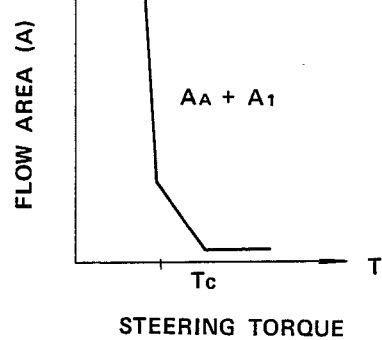
FIG. 6A is a chart that shows the relationship between the equivalent flow area and the steering torque.
Figure 6B:
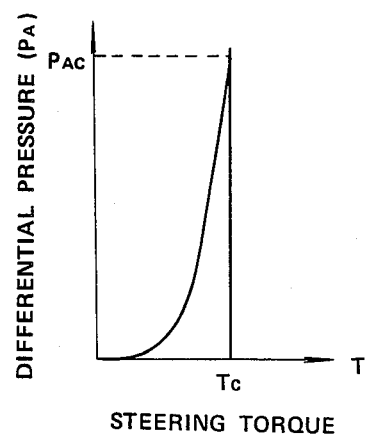
FIG. 6B is a chart that shows the relationship between the differential pressure (i.e. power assist pressure) and the steering torque.

The characteristic curve for the overall restricted flow area A in relation to the steering torque is shown in FIG. 6A, and the characteristic curve for the differential pressure $P_A$ between the chambers 30 and 32 in relation to the steering torque is shown in FIG. 6B. As will be apparent from these characteristic curves in FIGS. 6A and 6B, when the vehicle speed is zero or nearly zero as in the case of garaging, a high differential pressure $P_{AC}$ is obtained in response to a relatively small steering torque $T_C$, whereby a large steering assist power is produced by the power cylinder 26 to urge the dirigible wheels to the right, thus making it possible to perform the steering operation in the right turn direction with a small steering effort.

When the steering wheel 34 is turned to the left, the variable orifices 48, 50 and 52 of the first set decrease their flow area $A_1$–$A_3$ in response to increase of steering torque, whilst the variable orifices 54, 56 and 58 of the second set come to be held in their fully open positions, reversely to the above described right turn case. The power cylinder 26 produces a steering assist power for urging the dirigible wheels to the left thus making it possible to perform the steering operation in the left turn direction with a small steering effort.

Upon constant high-speed running of the vehicle, the vehicle speed sensor 74 produces a signal $V_D$ representing the detected speed of the vehicle and applies it to the control unit 76 which in turn generates an electric current $I_V$ of a relatively large magnitude for energization of the solenoid operatively connected to the variable orifice 70. The actuator 78 is thus actuated so as to hold the variable orifice 70 in a position effecting a relatively large flow area $A_5$. In this instance, when the steering wheel 34 is in the neutral position and not subjected to any steering torque, the variable orifices 48–58 of the control valve 20 are all maintained in their fully open positions, thus not causing any pressure differential $P_A$ between the chambers 30 and 32 of the power cylinder 26 and therefore not causing any steering assist power by the power cylinder 26.

When the steering wheel 34 is turned from the neutral position, for example, to the right, the variable orifices 54, 56 and 58 of the second set decrease their flow areas $A_1$–$A_3$ whilst the variable orifices 48, 50 and 52 of the first set remain in their fully open positions. Accordingly, the control valve 20 can be regarded as having such an equivalent fluid circuit structure shown in FIG. 7.

Figure 7:
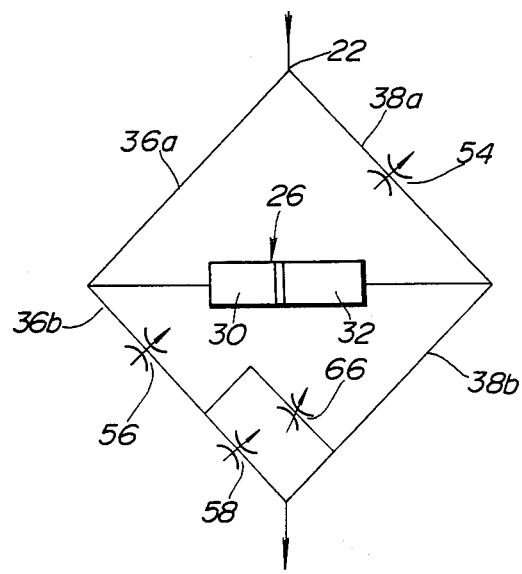
FIG. 7 is a fragmentary enlarged view of FIG. 1 showing the position of parts assumed upon right turn at high vehicle speeds.
Figure 8:
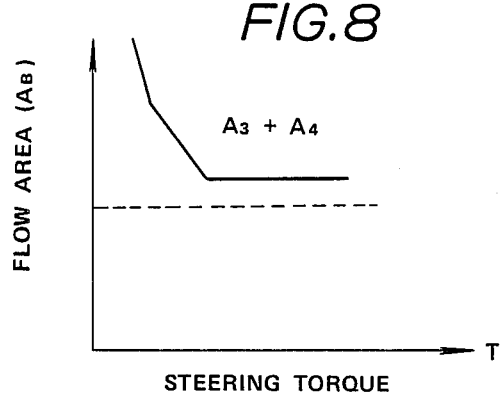
FIG. 8 is a chart that shows the relationship between the equivalent flow area and the steering torque.

As seen from FIG. 7, the variable orifice 58 and the variable orifice 66 have a parallel relationship with each other and can be assumed to constitute a single variable orifice having, as shown in FIG. 8, a combined equivalent flow area $A_B$ which is given by the sum of the flow areas $A_3$ and $A_4$. Thus, $$A_B = A_3 + A_4 \tag{6}$$

Figure 9:
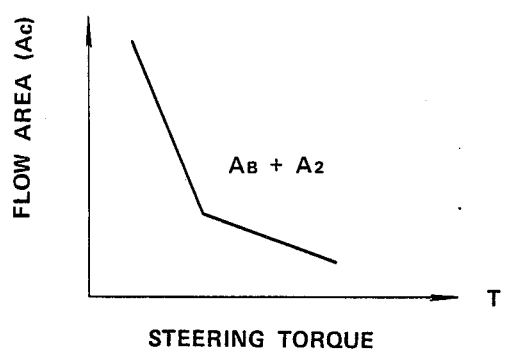
FIG. 9 is a chart that shows the relationship between the equivalent flow area and the steering torque.

The variable orifice of the equivalent flow area $A_B$ and the variable orifice 56 have a series relationship with each other and can be assumed to constitute a single variable orifice having, as shown in FIG. 9, a combined equivalent flow area $A_C$ which is given by the following expression:

$$A_C = \frac{1}{\sqrt{1/A_B^2 + 1/A_2^2}} \tag{7}$$

In this instance, since the flow area $A_2$ of the variable orifice 56 is smaller than the combined equivalent flow area $A_B$ for a given steering torque, the variable orifice 56 is more effective for variation of the combined equivalent flow area $A_C$.

Figure 10A:
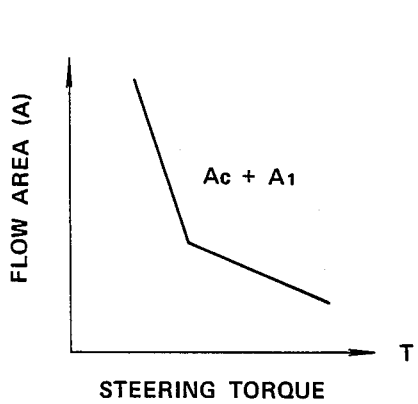
FIG. 10A is a chart that shows the relationship between the equivalent flow area and the steering torque.
Figure 10B:
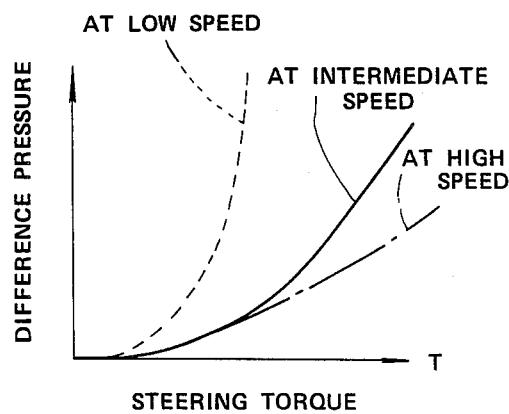
FIG. 10B is a chart that the relationship between the differential pressure (i.e. power assist pressure) and the steering torque.

Since the variable orifice of the combined equivalent flow area $A_C$ in the passage section 36b has a parallel relationship with the variable orifice 54 of the flow area $A_1$ in the passage section 38a, the overall restricted flow area A of the control valve 20 can be given, as shown in FIG. 10A, by the sum of the equivalent flow area $A_C$ and the flow area $A_1$. Thus, $$A = A_c + A_1 \tag{8}$$

As will be understood from the comparison of the characteristic curves in FIGS. 6A and 10A, the overall restricted flow area A of the control valve 20 is larger at high speeds than at low speeds, thus enabling the power cylinder 26 to produce a larger steering assist power at low speeds and a smaller steering assist power at high speeds. The steering operation at high speeds therefore requires a larger effort, resulting in that the feel of operation of the steering wheel becomes heavier in response to increase of vehicle speed. In this connection, by setting either of the flow area $A_2$ of the variable orifice 56 or the flow area $A_4$ of the variable orifice 66, or the both of same suitably, the steering assist power at high speeds can be set suitably, thus making it possible to provide a suitable resistance to turn of the steering wheel at high speeds for thereby preventing inadvertent quick turn of the steering wheel 34 to improve the vehicle stability.

Upon turning of the vehicle to the right at high speeds, further turning of the steering wheel 34 to the right while increasing the steering torque causes the flow areas $A_1$–$A_3$ of the variable orifices 54, 56 and 58 to decrease further, thus increasing the differential pressure $P_C$ between the inlet and return ports 22 and 24 and thereby increasing the flow rate $Q_B$ of fluid passing the variable orifice 70 and the fixed flow area orifice 72. As the flow rate $Q_B$ increases in response to increase of the differential pressure $P_C$, the differential pressure $P_O$ between the upstream and downstream sides of the fixed flow area orifice 72 increases thus causing the piston 82 of the actuator 78 to move further rightwards thereby increasing the flow area $A_4$ of the variable orifice 66. Due to this, $$\sqrt{1/A_2^2 + 1/A_3^2}$$

in the expression (7) decreases, thus increasing the equivalent flow area $A_C$ of the passage section 36b. The fluid pressure supplied to the chamber 32 of the power cylinder 26 reduces further to make the resulting steering wheel 34 becomes heavier, and the characteristic curve for the differential pressure $P_A$ produced by the power cylinder 26 in relation to the steering torque becomes more desirable.

Furthermore, as in the case of running over a rough road, vibrations based upon the road surface condition are applied through the dirigible wheels and the steering mechanism to the power cylinder 26 as a varying load thereto for thereby varying the differential pressure $P_C$ between the inlet and return ports 22 and 24 of the control valve 20 and the flow rate $Q_B$ of fluid supplied to the variable orifice 70 and the fixed flow area orifice 72, thus allowing the feel of operation of the steering wheel 34 to vary depending upon variations of the road surface condition and therefore making it possible for the vehicle driver to know the road surface condition correctly and assuredly.

Upon intermediate-speed running, i.e., running at speeds intermediate between high speeds and low speeds, the flow areas $A_4$ and $A_5$ of the variable orifices 66 and 70 are caused to vary depending upon variations of vehicle speed so that the differential pressure $P_A$ for a given steering torque decreases in response to increase of vehicle speed. By this, the steering assist power can be controlled so as to meet the running condition of the vehicle more accurately.

Figure 11:
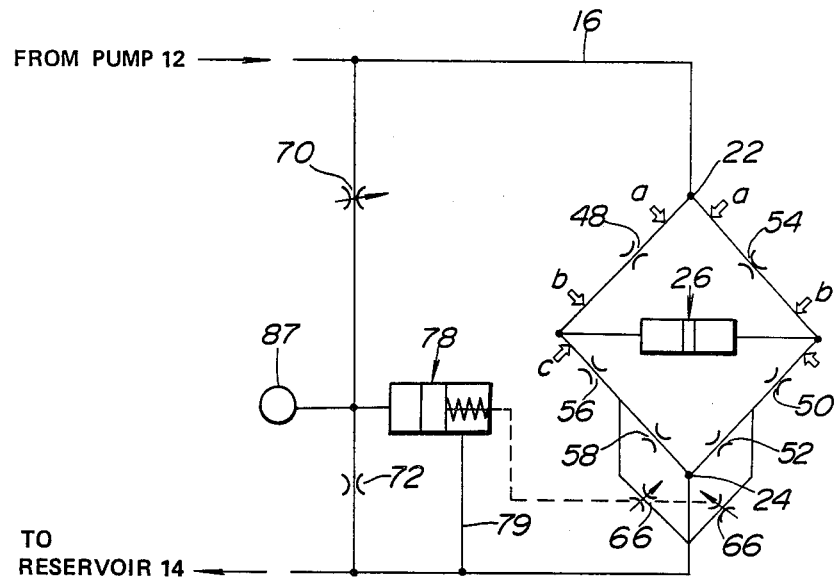
FIG. 11 is a simplified, partly omitted view of a modification of the present invention.

FIG. 11 shows another embodiment. This embodiment is provided with bypass passages 130 and 132 in place of the bypass passage 64 in the previous embodiment. The passages 130 and 132 are arranged in such a manner as to bypass the variable orifices 52 and 58, respectively. Variable orifices 66 and 66 are disposed in and partly define the bypass passages 130 and 132, respectively. The variable orifices 66 and 66 are adapted to be actuated by the actuator 78 in the manner similar to the previous embodiment. Except for the above, this embodiment is substantially similar to the previous embodiment.

In operation, turning of the steering wheel 34 under a vehicle standstill condition causes the variable orifices 66 and 66 to be put in their fully closed positions thus holding the bypass passages 130 and 132 in their passage blocking positions. The control valve 20 therefore can be regarded as having such a fluid circuit structure as shown in FIG. 4. A large steering assist power is produced by the power cylinder 26 for making it possible to perfom the steering operation with a small steering effort.

Upon turning of the steering wheel, e.g. to the right, during high-speed running of the vehicle, the flow passage section 36b functions in exactly the same manner as the previous embodiment. On the other hand, the variable orifice 52 in the passage section 38b and the variable orifice 66 in the bypass passage 88 have a parallel relationship with each other and can be assumed to constitute a single valve having an equivalent flow area $A_D$ which is given by the sum of the flow area $A_3$ of the variable orifice 52 and the flow area $A_4$ of the variable orifice 66 and therefore differs from the corresponding equivalent flow area in the previous embodiment. However, since the variable orifice 50 in the passage section 38b is held in a fully open position and more effective for variation of the equivalent flow area $A_D$, the passage section 38b and the bypass passage 88 in this embodiment can produce substantially the same effect as the passage section 38b of the previous embodiment. As a result, upon turning of the steering wheel 34 during high-speed running of the vehicle, a relatively small steering assist power is produced by the power cylinder 26 similarly to the previous embodiment, whereby to make the feel of operation of the steering wheel 34 heavy.

In the above described embodiment of FIG. 11, the parallel passage arrangements, one of which includes the variable orifices 52 and 66 and the other includes the variable orifices 58 and 66, are disposed downstream of the variable orifices 50 and 56, this is not limitative. For example, the parallel passage arrangements can be respectively disposed either at locations downstream of the variable orifices 48 and 54 (the locations indicated by "a"), at locations intermediate between the variable orifice 48 and the left turn port 40 and between the variable orifice 54 and the right turn port 44 (the locations indicated by "b") or at locations intermediate between the left turn port 40 and the variable orifice 56 and between the right turn port 44 and the variable orifice 50 (the locations indicated by "c"). However, in the case of disposition at the places "a" and "b", it is necessary to interchange the variable orifices 48 and 54 with the variable orifices 50 and 56, respectively.

Figure 12:
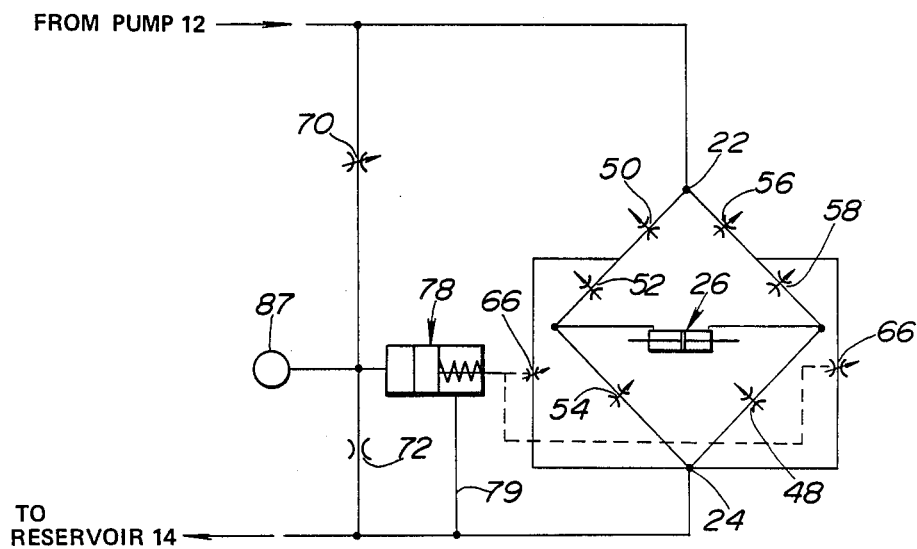
FIG. 12 is a view similar to FIG. 11 but showing another modification of the present invention.

FIG. 12 shows a further embodiment. In this embodiment, the variable orifices 50 and 52 are arranged in series in the passage section 36a while the variable orifices 56 and 58 are arranged in series in the passage section 38a. The variable orifices 48 and 50 are arranged in the passage sections 38b and 36b, respectively. A bypass passage 134 is provided which fluidly connect the return port 24 to the passage section 36a at a location intermediate between the variable orifices 50 and 52. Another bypass passage 136 is provided which fluidly connects the return port 24 to the passage section 38a at a location intermediate between the variable orifices 56 and 58. Variable orifices 66 and 66 are disposed in and partly define the bypass passages 134 and 136, respectively.

Figure 13:
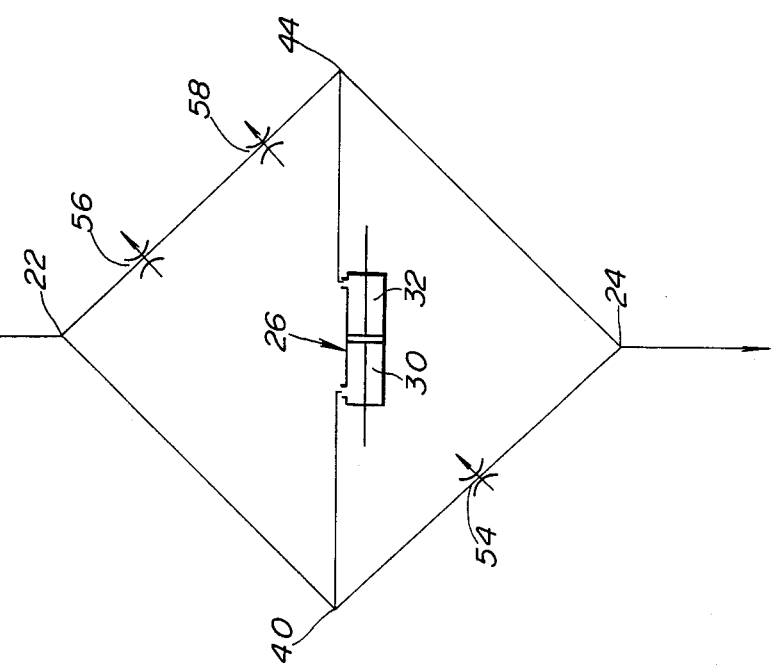
FIG. 13 is a fragmentary enlarged view of FIG. 12 showing the position of parts assumed upon right turn at zero vehicle speed.

In operation, during running of the vehicle at a low speed near zero, the variable orifices 66 and 66 are held in their nearly completely closed positions. Under this condition, turning of the steering wheel 34 to the right causes the variable orifices 54, 56 and 58 of the second set to decrease their flow areas $A_1$–$A_3$ in accordance with the magnitude of steering torque whilst the variable orifices 48, 50 and 52 of the first set are held in their fully open positions. The control valve 20 can therefor be regarded as having such an equivalent fluid circuit structure as shown in FIG. 13.

When this is the case, the variable orifices 56 and 58 are arranged in series with each other and can be assumed to constitute a single variable orifice having an equivalent flow area $A_E$ which is given by the following expression:

$$A_E = \frac{1}{\sqrt{1/A_2^2 + 1/A_3^2}} \tag{7}$$

In this instance, the variable orifice 58 is more effective for variation of the equivalent flow area $A_E$ than the variable orifice 56 since the variable orifice 58 is adapted to effect a smaller flow area than the variable orifice 56 for a given steering torque.

This embodiment can therefore produce exactly the same effect as the previous embodiment during low-speed running of the vehicle.

Figure 14:
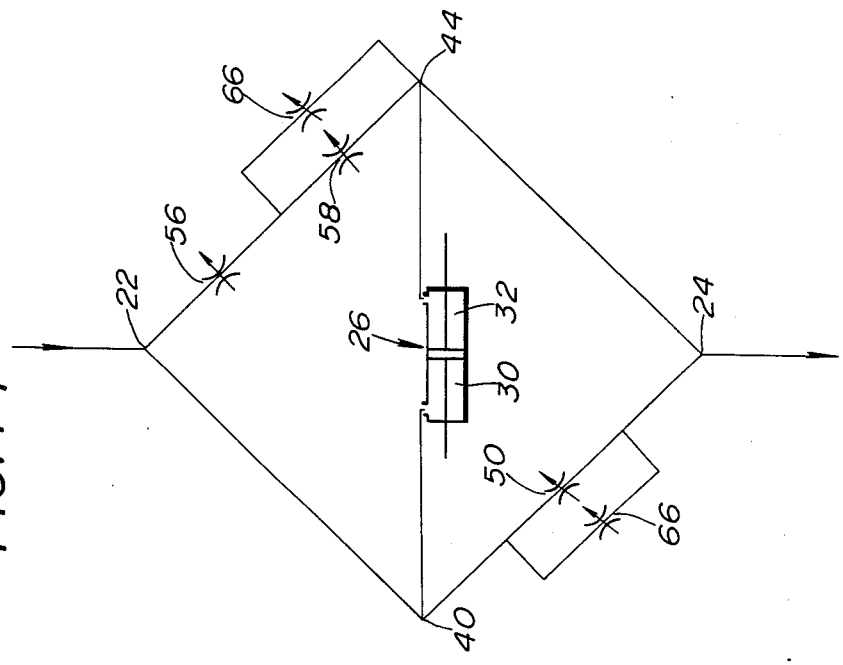
FIG. 14 is a fragmentary enlarged view of FIG. 12 showing the position of parts assumed upon right turn at high vehicle speeds.

Upon high-speed running of the vehicle, the flow area $A_4$ of the variable orifices 66 and 66 become larger. The control valve 20 can therefore be assumed to have such an equivalent fluid circuit structure as shown in FIG. 14 upon turning of the steering wheel 34 to the right. When this is the case, the combined equivalent flow area $A_F$ for the passage section 38a is determined by the following expression:

$$A_F = \frac{1}{\sqrt{1/A_2^2 + 1/(A_3 + A_4)^2}} \tag{8}$$

The variable orifice 56 is more effective for variation of the equivalent flow area $A_F$ than the combined variable orifices 58 and 66. On the other hand, the variable orifices 50 and 66 in the passage section 36b are arranged in parallel with each other and can be assumed to constitute a single variable orifice having an equivalent flow area $A_G$ which is determined by the following expression:

$$A_g = A_1 + A_4 \tag{9}$$

By suitably setting the characteristic of the variable orifice 66, this embodiment can be made so as to produce substantially the same effect as the previous embodiments.

Figure 15:
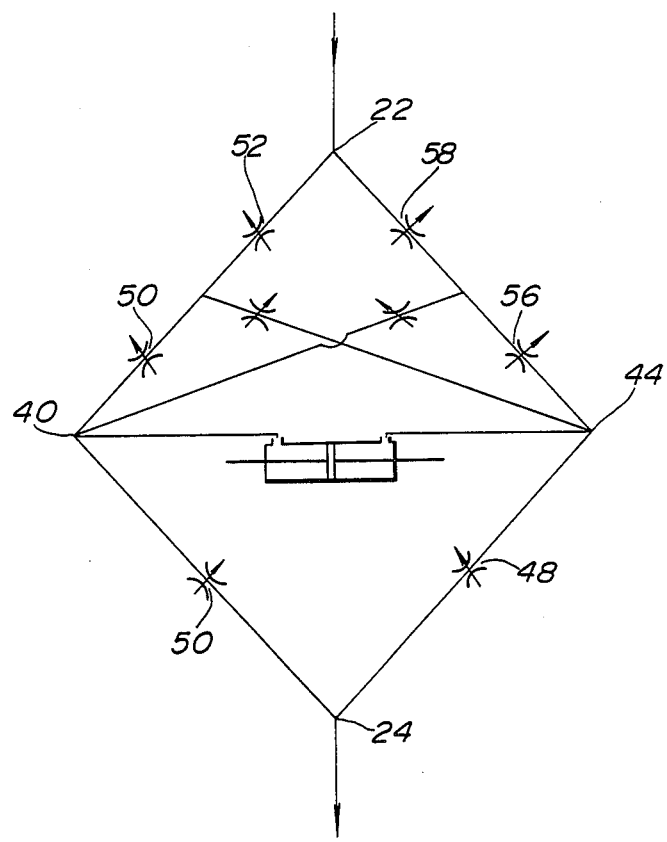
FIG. 15 is a fragmentary enlarged view of a further modification of the present invention.

While in the above described embodiment of FIG. 12 the fluid passages 92 and 94 have been described and shown as being connected at one ends to the return port 24, this is not limitative. For example, the passages 134 and 136 may otherwise be arranged in a mutually crossing manner so as to be connected to the right turn port 44 and the left turn port 40, respectively, as shown in FIG. 15 to produce the same effect.

Further, while the rotatry valve has been described and shown as being a practical example of a control valve, this is not limitative. For example, a spool type valve responsive to steering torque can be used in place therefor.

Figure 16:
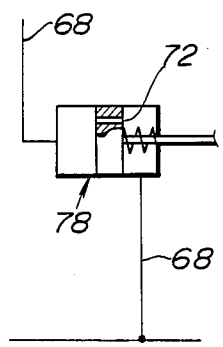
FIGS. 16 to 18 are variants of an actuator employed in the power steering system of FIG. 1.
Figure 17:
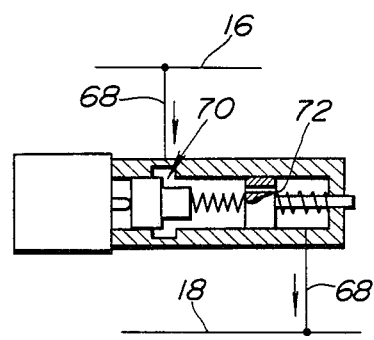
Figure 18:
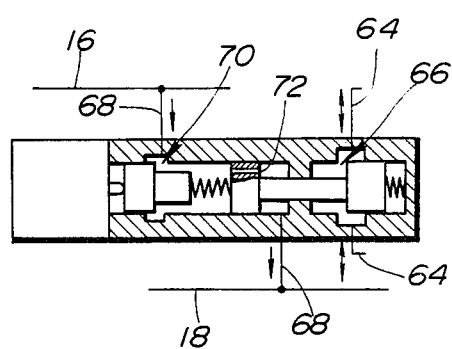

Further, while the fixed flow area orifice 72 and the actuator 78 in the form of a hydraulic cylinder are described and shown as being independent members, this is not limitative. For example, as shown in FIG. 16, the fixed flow area orifice 72 can be formed in the piston 82 of the actuator 78 so as to cooperate therewith to constitute a single unit, or the variable orifice 70, the fixed flow area orifice 72 and the actuator 78 can be arranged so as to constitute a single unit as shown in FIGS. 17 and 18. By the above modifications, the number of parts necessitated can be reduced thus making it possible to reduce the manufacturing cost.

Further, while the variable orifice 70 has been described and shown as being controlled in response to vehicle speed, this is not limitative. For example, the variable orifice 70 may otherwise be controlled in response to the angle of rotation of the steering wheel 34.

Further, while the variable orifices 48 and 54 have been described and shown as being of the same kind as the variable orifices 52 and 58, this is not limitative. They can be of the different kinds from each other.

Further, while the present invention has been described and shown as being applied to a rack and pinion steering gear, this is not limitative. The present invention may otherwise be applied to a different type steering gear mechanism.

What is claimed is:
1. A power steering system for a vehicle comprising:
a source of fluid flow;
a control valve having an inlet port and a return port;
an output flow passage providing communication between said inlet port and said source of fluid flow;
a return flow pasage providing communication between said return port and said source of fluid flow;
said control valve having two valve passages arranged in parallel between said inlet port and said return port and fluidly connected to same;
said fluid passages of said control valve being respectively provided with a left turn port and right turn port;
a fluid motor having a piston and two pressure chambers divided by said piston, said chambers being fluidly connected to said left turn port and said right turn port, respectively;
said control valve having a plurality of steering torque responsive variable orifices which are disposed in and partly define said valve passages, said steering torque responsive variable orifices being variable in flow area in response to variation of steering torque to vary differential pressure between said chambers of said fluid motor;
a flow control passage fluidly interconnecting said output flow passage and said return flow passage to bypass said control valve;
a control valve operation modifying variable orifice disposed in and partly defining said flow control passage, said control valve operation modifying variable orifice being variable in flow area in response to at least one of vehicle control factors other than steering torque;
a fixed flow area orifice disposed in and partly defining said flow control passage at a location downstream of said control valve operation modifying variable orifice;
a differential pressure passage providing communication between the upstream and downstream sides of said fixed flow area orifice;
an actuator disposed in and partly defining said differential pressure passage, said actuator having a pressure movable part which is movable in response to variation of differential pressure produced by said fixed flow area orifice;
said control valve having bypass passage means for bypassing at least one of said steering torque responsive variable orifices; and
said bypass passage means including a differential pressure responsive variable orifice operatively connected to said pressure movable part of said actuator and variable in flow area in response to movement of said pressure movable part of said actuator.

2. A power steering system as set forth in claim 1 wherein said control valve operation modifying variable orifice is formed into an orifice valve which comprises an orifice valve housing formed with an orifice valve opening and an orifice valve spool constituting said pressure movable part and received in said orifice valve opening, said orifice valve opening having an increased diameter orifice valve opening section, said orifice valve spool having an orifice valve land which cooperates with said increased diameter orifice valve opening section to define said control valve modifying variable orifice, said orifice valve further comprising spring means at one axial end of said orifice valve spool for urging said orifice valve spool in the direction causing said control valve operation modifying variable orifice to increase in flow area and drive means responsive to said at least one control factor for urging said orifice valve spool in the direction causing said control valve modifying variable orifice to decrease in flow area, said orifice valve spool having another orifice valve land which cooperates with said first mentioned orifice valve land to define therebetween an annular space, said orifice valve spool having a central opening and a radial opening providing communication between said annular valve opening section and said central opening, said orifice valve opening having an orifice valve opening section at said one axial end of said orifice valve spool for receiving therein said spring, whrein said increased diameter opening section, said annular space between said orifice valve lands, said radial opening, said central opening and said orifice valve opening section at said one axial end of said orifice valve spool constitute part of said flow control passage.

3. A power steering system as set forth in claim 2 wherein said actuator comprises an actuator valve opening formed in said valve housing and an actuator valve spool received in said actuator valve opening, said actuator valve opening being axially aligned with said orifice valve opening and communicated at one axial end with same, said actuator valve spool having two actuator valve lands of the same diameter, said actuator valve opening having a first actuator valve opening section of a first kind diameter which is equal in diameter to said actuator valve lands and located next to said orifice valve opening section at said one axial end of said orifice valve spool, said first actuator valve opening section receiving therein one of said actuator valve lands in such a manner as to subject one axial end of said actuator valve spool to fluid pressure in said orifice valve opening section at said one axial end of said orifice valve, said actuator valve spool having an intermediate actuator valve spool portion between said two actuator valve lands, said intermediate actuator valve spool portion being partly received in said first actuator valve opening section to define therearound an annular space which is communicated with the downstream side of said fixed flow area orifice, said actuator valve opening further having a second actuator valve opening section of the first kind diameter which is locatd so as to receive therein the other of said actuator valve lands in such a manner as to define a fluid chamber at one axial end of said actuator valve spool and a third actuator valve opening section of the first kind diameter located between said first and second actuator valve opening sections to receive therewithin said intermediate actuator valve spool portion to define therearound an annular space which constitutes part of said bypass passage means, said actuator valve opening further having a fourth actuator valve opening section of a second kind diameter which is larger than said first kind diameter, said fourth actuator valve opening section being located between said second and third actuator valve opening sections and defining around the other of said actuator valve lands an annular space which constitute part of said bypass passage means, said actuator valve land and said fourth actuator valve opening section cooperating to constitute said differential pressure responsive variable orifice, said actuator valve opening further having a fifth actuator valve opening section of a third kind diameter which is smaler than said first kind diameter, said fifth actuator valve opening section being located between said first and third actuator valve opening sections to fittingly receive therein said intermediate actuator valve spool portion, said actuator valve spool being provided with a central opening and a radial opening through which said fluid chamber at said one axial end of said actuator valve spool is communicated with said annular space in said actuator valve opening, wherein said annular space defined by said first actuator valve section and said intermediate actuator valve spool portion, said central opening of said actuator valve spool and said fluid chamber at said one axial end of said actuator valve spool cooperating to define said one of said pressure chambers of said actuator, whilst said other of said pressure chambers of said actuator being defined by said orifice valve opening section at said one axial end of said orifice valve spool.

4. A power steering system as set forth in claim 1 further comprising a steering wheel operatively connected to said steering torque responsive variable orifices, said steering torque responsive variable orifices comprise first and second sets, said steering torque responsive variable orifices of the first set being adapted to decrease their flow areas respectively as steering torque increase during left turn of said steering wheel, said steering torque responsive variable orifices of the second set being adapted to decrease their flow areas respectively as steering torque increases during right turn of said steering wheel, first one of said steering torque responsive variable orifices of the first set being located between said inlet port and said left turn port, second one of said steering torque responsive variable orifices of the first set being located between said right turn port and said return port, third one of said steering torque responsive variable orifices of the first set being located between said return port and said second one of said steering torque responsive variable orifices of the first set, first one of said steering torque responsive variable orifices of the second set being located between said being located between said inlet port and said right turn port, second one of said steering torque responsive variable orifices of the second set being located between said left turn port and said return port, third one of said steering torque responsive variable orifices of the second set being located between said return port and said second one of said steering torque responsive variable orifices of the second set, one of said valve passages having a bypass port between said second and third steering torque responsive variable orifices of the first set, said bypass passage means further including a bypass passage providing communication between said bypass ports, said differential pressure responsive variable orifice being disposed in and partly defining said bypass passage.

5. A power steering system as set forth in claim 4 wherein said first and third steering torque responsive variable orifices of the first and second sets are of the same kind and adapted to effect a larger flow area than said second steering torque responsive variable orifices of the first and second sets for a given steering torque.

6. A power steering system as set forth in claim 1 further comprising a steering wheel operatively connected to said steering torque responsive variable orifices, said steering torque responsive variable orifices comprise first and second sets, said steering torque responsive variable orifices of the first set being adapted to decrease their flow areas respective as steering torque increases during right turn of said steering wheel, said steering torque responsive variable orifices of the second set being adapted to decrease their flow areas respectively as steering torque increases during left turn of said steering wheel, first one of said steering torque responsive variable orifices of the first set being located between said inlet port and said left turn port, second one of said steering torque responsive variable orifices of the first set being located between said right turn port and said return port, third one of said steering torque responsive variable orifices of the first set being located between said return port and said second one of said steering torque responsive variable orifice of the first set, first one of said steering torque responsive variable orifices of the second set being located between said inlet port and said right turn port, second one of said steering torque responsive variable orifices of the second set being located between said left turn port and said return port, third one of said steering torque responsive variable orifices of the second set being located between said return port and said second one of said steering torque responsive variable orifices of the second set, one of said valve passage having a bypass port between said second and third steering torque responsive variable orifices of the second set, the other of said valve passages having a bypass port between said second and third steering torque responsive variable orifices of the first set, said bypass passage means further including first and second bypass passages fluidly connecting said bypass ports to said return passage, respectively and a second differential pressure responsive variable orifice operatively connected to said pressure movable part of said actuator, said first mentioned differential pressure responsive variable orifice and said second differential pressure responsive variable orifice being disposed in and partly defining said first and second bypass passages, respectively.

7. A power steering system as set forth in claim 6 wherein said first and third steering torque responsive variable orifices of the first and second sets are of the same kind and adapted to effect a larger flow area than said second steering torque responsive variable orifices of the first and second sets for a given steering torque.

8. A power steering system as set forth in claim 1 further comprising a steering wheel operatively connected to asid pressure movable part of said actuator, said steering torque responsive variable orifices comprise first and second sets, said steering torque responsive variable orifices of the first set being adapted to decrease their flow areas respectively as steering torque increases during left turn of said steering wheel, said steering torque responsive variable orifices of the second set being adapted to ecrease their flow areas respectively as steering torque increases during right turn of said steering wheel, first one of said steering torque responsive variable orifices of the first set being located between said right turn port and said return port, second one of said steering torque responsive variable orifices of the first set being located between said inlet port and said left turn port, third one of said steering torque responsive variable orifices of the first set being located between said second one of said steering torque responsive variable orifices and said left turn port, first one of said steering torque responsive variable orifices of the second set being located between said left turn port and said return port, second one of said steering torque responsive variable orifices of the second set being located between said inlet port and said right turn port, third one of said steering torque responsive variable orifices of the second set being located between said second one of said steering torque responsive variable orifices of the second set and said right turn port, one of said valve passages having a bypass port between said second and third steering torque responsive variable orifices of the second set, the other of said valve passages having a bypass port between said second and third steering torque responsive variable orifices of the first set, said bypass passage means further including first and second bypass passages fluidly connecting said bypass ports to said left turn port and said right turn port, respectively and a second differential pressure responsive variable orifice operatively connected to said pressure movable part of said actuator, said first mentioned differential pressure responsive variable orifice and said second differential pressure responsive variable orifice being disposed in and partly defining said first and second bypass passages. respectively.

9. A power steering system as set forth in claim 8 wherein said first and third steering torque responsive variable orifices of the first and second sets are of the same kind and adapted to effect a larger flow area than said second steering torque responsive variable orifices of the first and second sets for a given steering torque.

* * * * *